UNITED STATES PATENT OFFICE.

FERDINAND F. MAYER, OF NEW YORK, N. Y., ASSIGNOR TO HIMSELF AND AUGUSTUS SCHELLER.

IMPROVEMENT IN THE MANUFACTURE OF CHLORIDE OF LEAD.

Specification forming part of Letters Patent No. 30,521, dated October 23, 1860.

*To all whom it may concern:*

Be it known that I, FERDINAND F. MAYER, of the city, county, and State of New York, have invented a new and Improved Mode of Producing Certain Compounds of Lead; and I do hereby declare that the following is a full, clear, and exact description of the same.

I take sulphate of lead, pure, or such as is obtained by oxidizing galena or by precipitating lead salts with sulphuric acid or with sulphates of other metals or with mixtures of such, and this sulphate of lead I mix into a thin paste with a concentrated solution of chloride of sodium or common salt, and in this state it is introduced into a saturated hot solution of chloride of sodium, where the same is decomposed. The largest portion of the lead precipitates as chloride of lead, and another portion, together with the impurities, remains in solution. The chloride of lead thus obtained can be used for the manufacture of metallic lead of oxychloride of lead or of any other desirable compound of lead, as will be presently more fully explained.

The chloride of lead precipitated from the solution is separated from the sulphate of lead that may have been carried down with it by washing with a solution of chloride of sodium, and it is now dissolved in a saturated hot solution of chloride of sodium or common salt. The solution thus obtained I use for preparing carbonate of lead by precipitating with carbonates of alkalies, for preparing oxychloride of lead by treating with caustic alkalies or alkaline earths, for preparing chromate of lead by precipitating with salts of chromic acid, for preparing binoxide of lead by treating with hypochlorites or chorinated alkalies or alkaline earths free of carbonic acid.

The precipitate of chloride of lead may also be converted into metallic lead or into the desired compounds without being dissolved by simple digestion with the above named agents, and by treating with nitric acid it can be converted into nitrate of lead.

In all cases the solution of chloride of sodium from which the lead salt has been precipitated is, if necessary, saturated with a fresh addition of chloride of sodium or common salt, and it can be used again and again for dissolving sulphate of lead or chloride of lead until supersaturated with sulphates, and after having been freed from these sulphates it can be used over again.

I do not claim broadly to be the discoverer of the fact that the sulphate of lead may be decomposed by the chloride of sodium; but,

Having thus fully described my invention, what I claim as new, and desire to secure by Letters Patent, is—

The method, substantially as herein described, of treating sulphate of lead with chloride of sodium, for the purpose set forth.

The mode, substantially as herein described, for producing the within named compounds of lead.

FERDINAND F. MAYER.

Witnesses:
B. GNOUD,
W. THOMPSON.